United States Patent [19]
Rannells

[11] 3,781,688
[45] Dec. 25, 1973

[54] CIRCUIT FOR IMPROVING RF PULSE RECEPTION FREQUENCY RESOLUTION WITHOUT RISE-TIME DEGRADATION

[75] Inventor: David C. Rannells, Menlo Park, Calif.

[73] Assignee: Itek Corporation, Lexington, Mass.

[22] Filed: Apr. 11, 1972

[21] Appl. No.: 242,960

[52] U.S. Cl.............................. 325/321, 325/489
[51] Int. Cl. ............................................ H03k 13/02
[58] Field of Search..................... 325/321, 351, 430, 325/469, 487, 490, 489; 328/38

[56] References Cited
UNITED STATES PATENTS

| | | | |
|---|---|---|---|
| 3,112,452 | 11/1963 | Kirkpatrick.......................... | 325/489 |
| 2,710,315 | 6/1955 | Tongue............................... | 325/489 |
| 3,281,698 | 10/1966 | Rose.................................. | 325/489 |
| 3,163,821 | 12/1964 | Hopner.............................. | 325/351 |
| 3,007,043 | 10/1961 | Rennenkampf..................... | 325/321 |

*Primary Examiner*—Daryl W. Cook
*Assistant Examiner*—Jeremiah Glassman
*Attorney*—Homer O. Blair et al.

[57] ABSTRACT

A filter circuit for detecting short pulses of radio frequency (RF) energy centered at a given center frequency and within a given narrow bandpass region. Received pulses of RF energy are upconverted in a frequency multiplier circuit to achieve resultant pulses at the same repetition rate and pulse width as the received pulses but having frequency spectrum components centered at a new center frequency of *n* times the given center frequency of the received pulses. These frequency spectrum components have the same absolute frequency and amplitude relationship to their new center frequency as the frequency spectrum components of the received pulses had to their given center frequency. The resultant pulses are then passed through a bandpass filter circuit having its bandpass region centered at the new center frequency and having a bandpass region wider than the width of the given narrow bandpass region. A detector circuit detects the passage of resultant pulses through the bandpass filter circuit. The multiplication of the received pulses by a factor of n allows the use of a bandpass filter circuit having a wider width than the given narrow bandpass region. This wider width bandpass filter allows the detection of relatively short pulses of RF energy.

13 Claims, 1 Drawing Figure

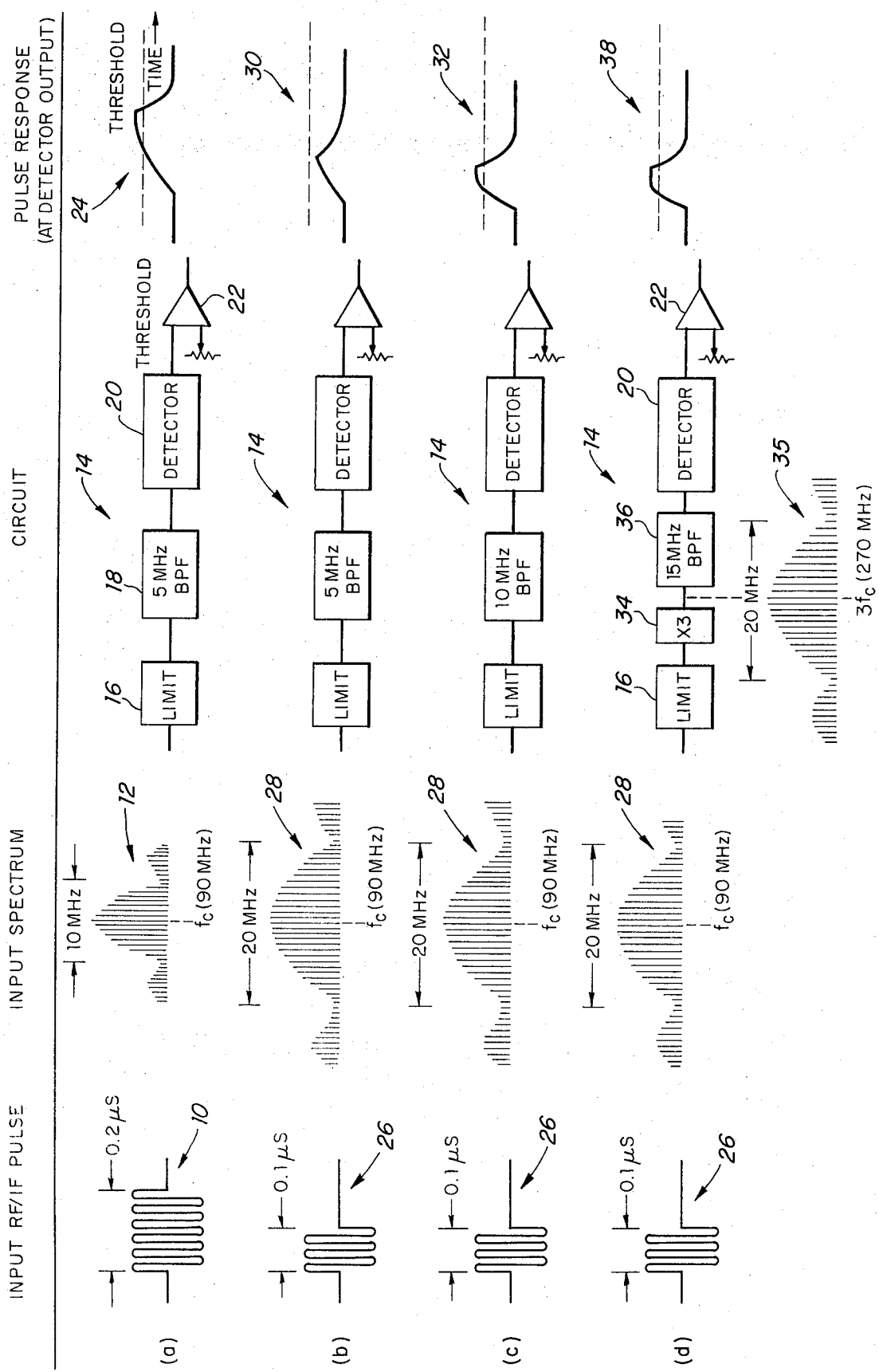

CIRCUIT FOR IMPROVING RF PULSE RECEPTION FREQUENCY RESOLUTION WITHOUT RISE-TIME DEGRADATION

BACKGROUND OF THE INVENTION

The present circuit relates generally to filter circuits, and more particularly pertains to a new and improved filter circuit for improving the frequency resolution of detected RF pulses without accompanying rise-time degradation. In the field of filter circuits wherein it is desired to detect a pulse of RF energy at one given frequency of interest, it has been the general practice to employ a simple bandpass filter centered at the given frequency of interest. A detector circuit would receive the output of the bandpass filter circuit and would trigger a threshold circuit when a pulse of RF energy was received at the given frequency of interest and the pulse had sufficient width to pass enough energy through the filter.

In communication systems, such as radar receivers, the bandpass filter is normally placed in the intermediate frequency (IF) section of the receiver. If a received signal is not fairly well tuned toward the center frequency of the bandpass filter, the signal will be noticably attenuated. In a typical radar receiver, a threshold circuit is used to sense when the signal out of the filter circuit is above a certain level. In order to provide an absolute amplitude reference for the threshold circuit to measure against, the received signal is usually passed through a tuned limiting amplifier prior to passing it through the filter circuit. The limiting amplifier assures that all signals entering the filter are of the same amplitude, so that the amplitude of signals at the output of the filter is a function of frequency only. Also, the limiting amplifier assures the pulses are rectangular pulses. Any signals not well centered in the filter suffer relative loss in passing through the filter and, if far enough from the center of the filter, a sufficient amount of the signal is not passed by the filter to trigger the threshold circuit.

A complicating factor arises in some radar systems though, in that the received signals are short pulses of RF energy. A review of reference materials in this area shows that the shorter the width of a pulse, the greater the bandwidth required for the filter to pass a sufficient amount of the signal energy through the filter circuit to trigger the threshold circuit. In general it can be stated that if the bandwidth of the bandpass filter is not at least as wide as the reciprocal of the width of a pulse passing through it, then the passed amplitude information will not be sufficient to allow detection of the pulse. In equation form, $B.W.=1/t$ where $t$ is the duration of the pulse in the RF pulse train.

Looking at this technical area from a different view, the width of a pulse may be seen to be important as follows. A typical LC filter circuit has a certain rise time associated with it during which the incoming RF energy is bringing the circuit to a resonant condition. It takes a finite amount of time for the filter circuit to build up to full resonance. If a pulse of RF energy is too short, the entire pulse of energy will be expended in raising the state of the circuit to a resonant condition, and very little of the RF pulse will be passed by the filter circuit. If a wider RF pulse is passed through the same filter circuit, the first part of that pulse brings the circuit to a resonant condition, and the remaining part of the pulse passes through the filter circuit. Applicant's invention provides a novel approach to the selective detection of very narrow RF pulses.

SUMMARY OF THE INVENTION

In accordance with a preferred embodiment, a filter circuit is disclosed for detecting a short pulse of energy at a given frequency of interest and within a given narrow bandwidth. The preferred embodiment provides a system wherein received pulses of energy are processed in an upconversion means to achieve resultant pulses at the same repetition rate and pulsewidth as the received pulses but having frequency components which are now centered about a new, higher, center frequency. The resultant pulses are then passed through a bandpass filter means having a bandwidth centered at the new, higher, center frequency and having a bandwidth wider than the width of the given bandwidth. The wider bandwidth of the bandpass filter allows detection of the resultant pulse over a wider bandwidth without, surprisingly, any sacrifice in frequency selectivity normally associated with a wider bandwidth filter. A detector means detects the passage of resultant pulses through the bandpass filter means. The circuit described above allows the detection of a pulse of energy when the duration of the pulse is substantially less than one over the given bandwidth of interest.

The operation of the preferred embodiment wherein short pulses of RF energy are detected may be accurately described mathematically. According to that mathematical model, the teachings of this invention have applicability to the detection of short pulses of energy other than merely RF energy, such as electromagnetic radiation at other frequencies, for instance light, and acoustical energy.

BRIEF DESCRIPTION OF THE DRAWING

Sections (a) through (d) of the FIGURE illustrate several waveforms, and the responses of different circuits to each waveform, and are helpful to a complete understanding of this invention.

DETAILED DESCRIPTION OF A PREFERRED EMBODIMENT

Section (a) of the FIGURE illustrates a typical detector circuit of the prior art. The received pulse of RF energy 10 has a pulse width of 0.2 microsecond. The waveform illustrated at 10 is the modulating signal. The input spectrum 12 of the RF carrier wave for the pulse 10 is centered at 90 megahertz, and has spectrum nulls at an interval of 5 megahertz. A typical prior art circuit for detecting the pulse 10 is illustrated by in section (a) of the FIGURE. A tuned limiting circuit 16 limits the amplitude of the received pulse to a reference amplitude so that the output of the filter circuit is a function of frequency only. The output of the limiting circuit 16 passes into a 5 megahertz bandpass filter circuit 18 which is centered at 90 megahertz. The output of the filter circuit is passed to a detector circuit 20 and then to a threshold circuit 22. Although the threshold circuit 22 is illustrated as a part of the overall circuit it is an optional circuit and may be omitted in certain applications. The output of the detector circuit 20 is illustrated at 24. It may be seen that as the pulse is passed through the 5 megahertz bandpass filter circuit, it takes a finite time to bring that circuit to resonance and to raise the output of the detector circuit 20 above the threshold value of threshold circuit 22. In the example illustrated in section (a) of the FIGURE, the output of the circuit would indicate that a pulse had been detected. As can be seen by the fact that the output of the detector circuit just barely made it above the threshold value, this prior art system is working at its limit, in that the input is a train of 0.2 microsecond pulses and the bandpass filter has a width of 5 megahertz (which equals 1/0.2 microsecond).

Section (b) of the FIGURE illustrates the same prior art circuit 14 attempting to detect a pulse 26 of RF energy having a pulse width of 0.1 microsecond.

The 0.1 microsecond pulse 26 has frequency spectrum, illustrated at 28, which is centered at 90 megahertz, but now has spectrum nulls at an interval of 20 megahertz. It is a characteristic of RF pulses and the electronics associated with them that, as the width of a pulse of RF energy gets shorter, the frequency distribution spreads to encompass a wider spectrum centered about the carrier frequency. This characteristic is graphically illustrated in sections 1(a) and 1(b) of the FIGURE. As illustrated at 30, an insufficient amount of energy passes through the bandpass filter and into the detector, and the output of the detector does not rise above the threshold value to trigger the threshold circuit. This is basically because the 5 megahertz width of the bandpass filter circuit passes only a small portion of the frequency components of the pulse spectrum, and eliminates most of the sidebands of the carrier wave.

In accordance with the teachings of the prior art, the bandwidth of the bandpass filter must be widened to 10 megahertz to detect a 0.1 microsecond pulse as shown in section (c) of the FIGURE. The 10 megahertz bandpass filter passes a sufficient amount of the frequency components of the pulse spectrum to trigger the threshold circuit as illustrated by waveform 32, but frequency selectivity is greatly reduced due to the widening.

Section (d) of the FIGURE illustrates a preferred embodiment of a filter circuit constructed in accordance with the teachings of this invention. An input pulse 26 having a pulse width of 0.1 microsecond is passed through limiter circuit 16 and into a multiplier circuit 34 for upconverting the frequency components of the pulse. Although circuit 34 is designated as a multiplier circuit, a frequency multiplier does not really multiply, it squares, cubes, etc., depending on how it is realized. The result of this process is to generate a family of frequency spectrums which are identical in form to the input spectrum (if the input RF pulses have rectangular envelopes), each of which is centered at a harmonic of the input signal carrier frequency. In general, frequency multipliers are realized in various forms of non-linear circuits, as broadband limiter circuits, diode rectifiers, tuned varacter circuits or step-recovery diode circuits. The frequency spectrum produced by the multiplier is illustrated at 35, and is a resultant pulse of RF energy which has the same pulse spectrum width and line separation as the input, but a new center frequency which has been multiplied by a factor of three. Specifically, the resultant pulse has spectrum nulls at an interval of 20 megahertz, the same width spectrum as illustrated at 28, but is now centered at 270 megahertz, three times 90 megahertz. The output of the multiplier circuit 34 is now passed into a bandpass filter circuit 36 having a bandwidth of 15 megahertz. The bandpass filter circuit 36, having a much wider bandwidth than the circuit 18, passes most of the frequency components of the carrier wave to detector 20. The wider width of the bandpass filter 36 results in the output of detector 20, illustrated at 38, triggering threshold circuit 22 in a rather rapid fashion. Theoretically, an Xn frequency multiplier circuit could be utilized where n is any number that will multiply the RF pulses by a sufficient factor to allow passage of a sufficient number of sideband frequency components of the carrier wave through a sufficiently wide bandwidth filter to allow detection of the pulse of RF energy.

The important point is that although the bandwidth has been tripled, frequency selectivity is not reduced because input signals outside of 90 ±2.5 megahertz will be outside of the 270 ±7.5 megahertz bandwidth of filter 36.

Although the bandwidth of the filter circuit was chosen to be three times the bandwidth of interest, commensurate with the X3 multiplication process, there is no reason why the bandwidth of the bandpass filter circuit has to be three times the given bandwidth of interest. The bandwidth of the bandpass filter circuit may be chosen to pass a sufficient amount of the carrier frequency sideband components to enable the detector to trigger the threshhold circuit. The 15 megahertz bandwidth of the filter following the X3 multiplier was chosen for convenience to yield the same (5 megahertz) system frequency resolution as the original system. In practice it might be reduced to a different bandwidth such as 12 megahertz. This would probably provide an adequate bandwidth to pass the pulse information while actually improving the frequency resolution from 5 megahertz to 4 megahertz.

It should be apparent that the filter circuit illustrated by FIGURE 1(d) results in a distinct improvement over prior art detector circuits, and allows the detection of a pulse of RF energy when the pulse width is less than one over the given bandwidth of interest. As illustrated by wave form 35 in section (d) of the FIGURE the characteristics of the RF pulse spectrum are essentially unaltered by the X3 frequency circuit, although the spectrum has been translated to a new center frequency (3F). This RF spectrum is then passed through the 15 megahertz bandpass filter with adequate amplitude fidelity to satisfy the threshhold requirements.

Theoretically, a X2 frequency multiplier and a 10 megahertz filter would also satisfy the requirements for detecting a 0.1 microsecond pulse of RF energy within a band pass region of 5 megahertz. However, in actual practice there are additional circuits in the system that contribute to a degradation in effective bandwidth, resulting in a marginal system bandwidth if a 10 megahertz filter is used.

While several embodiments have been described, the teachings of this invention will suggest many other embodiments to those skilled in the art.

I claim:

1. A system for detecting a pulse of energy within a given narrow bandwidth centered about a given center frequency and having a given pulse-width and comprising:
    a. an input means for receiving an input pulse of energy having frequency components within an input pulse bandwidth centered about said given center frequency;
    b. means, coupled to said input means, for upconverting the frequency components of said input pulse of energy to produce a resultant pulse of energy having frequency components centered about a new center frequency which is higher than said given center frequency as a result of the upconversion and having a resultant pulse bandwidth which is substantially the same as said input pulse bandwidth;

c. a bandpass filter means coupled to said upconverting means and having its bandwidth centered at said new, higher, center frequency and being wider than said given narrow bandwidth whereby the wider bandwidth of the bandpass filter means enables detection of the resultant pulse over a wider bandwidth without loss of sensitivity by the system; and d. a detector means coupled to the output of said bandpass filter means for detecting the passage of the resultant pulse through said bandpass filter means.

2. A system as set forth in claim 1 wherein the system detects pulses of radio frequency energy, and said input means includes means for receiving an input pulse of radio frequency energy.

3. A system as set forth in claim 2 wherein said upconverting means includes a frequency multiplier means for multiplying the frequency components of the input pulse of energy by a factor of $n$.

4. A system as set forth in claim 3 and including a tuned limiter means coupled between said input means and said frequency multiplier means.

5. A system as set forth in claim 4 and including a threshold means coupled to the output of said detector means.

6. A system as set forth in claim 5 wherein said bandpass filter means has a bandwidth which is greater than the reciprocal of the shortest given pulsewidth desired to be detected.

7. A system as set forth in claim 6 wherein:
a. said frequency multiplier means includes means for multiplying the frequency components of said input pulse of energy by a factor of $n$ of at least two; and
b. said bandpass filter means has a bandwidth at least twice as wide as said given narrow bandwidth.

8. A system as set forth in claim 1 wherein said bandpass filter means has a bandwidth which is greater than the reciprocal of the shortest given pulsewidth desired to be detected.

9. A system as set forth in claim 8 wherein the system detects pulses of radio frequency energy, and said input means includes means for receiving an input pulse of radio frequency energy.

10. A system as set forth in claim 9 wherein said upconverting means includes a frequency multiplier means for multiplying the frequency components of the input pulse of energy by a factor of $n$.

11. A system as set forth in claim 10 and including a tuned limiter means coupled between said input means and said frequency multiplier means.

12. A system as set forth in claim 11 and including a threshold means coupled to the output of said detector means.

13. A system as set forth in claim 12 wherein:
a. said frequency multiplier means includes means for multiplying the frequency components of said input pulse of energy by a factor of $n$ of at least two; and
b. said bandpass filter means has a bandwidth at least twice as wide as said given narrow bandwidth.

* * * * *